US012659571B2

(12) United States Patent
Varna et al.

(10) Patent No.: US 12,659,571 B2
(45) Date of Patent: Jun. 16, 2026

(54) METHOD AND SYSTEM FOR A FACE DETECTION MANAGEMENT

(71) Applicant: SAMSUNG ELECTRONICS CO., LTD., Suwon-si (KR)

(72) Inventors: Rahul Varna, Bangalore (IN); Gaurav Khandelwal, Bangalore (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 44 days.

(21) Appl. No.: 18/792,173

(22) Filed: Aug. 1, 2024

(65) Prior Publication Data

US 2024/0397197 A1 Nov. 28, 2024

Related U.S. Application Data

(63) Continuation of application No. PCT/KR2023/001416, filed on Jan. 31, 2023.

(30) Foreign Application Priority Data

Feb. 1, 2022 (IN) ............................. 202241005439
Aug. 11, 2022 (IN) ............................. 202241005439

(51) Int. Cl.
*H04N 23/63* (2023.01)
*G06V 40/16* (2022.01)
(Continued)

(52) U.S. Cl.
CPC ......... *H04N 23/632* (2023.01); *G06V 40/166* (2022.01); *H04N 23/611* (2023.01); *H04N 23/69* (2023.01)

(58) Field of Classification Search
None
See application file for complete search history.

(56) References Cited

U.S. PATENT DOCUMENTS 9,185,291 B1 11/2015 Shabtay et al.
9,998,651 B2 6/2018 Bandlamudi et al.
(Continued)

FOREIGN PATENT DOCUMENTS

CN 105812746 A 7/2016
WO 2021/208371 A1 10/2021
WO 2021/220892 A1 11/2021

OTHER PUBLICATIONS

Communication dated Feb. 26, 2025, issued by European Patent Office in European Patent Application No. 23749941.3.
(Continued)

*Primary Examiner* — Cynthia Calderon
(74) *Attorney, Agent, or Firm* — Sughrue Mion, PLLC

(57) ABSTRACT

In one or more embodiments, a method implemented in a multi camera device for a face detection management is disclosed. The method includes activating a second imaging sensor to capture a second preview frame of a scene at a higher zoom level than a first preview frame comprising at least one human with a face. The method includes detecting the face of the at least one human captured in the second preview frame upon capturing of the second preview frame. The method includes determining a set of facial co-ordinates associated with the face and a plurality of pre-defined parameters associated with the at least one human in the second preview frame. The method includes applying the set of facial co-ordinates and the plurality of pre-defined parameters to the first preview frame to generate a modified first preview frame. The method includes displaying the modified first preview frame as a camera preview.

20 Claims, 6 Drawing Sheets

(51) Int. Cl.
H04N 23/611 (2023.01)
H04N 23/69 (2023.01)

(56) References Cited

U.S. PATENT DOCUMENTS

| | | | |
|---|---|---|---|
| 10,154,186 B2 * | 12/2018 | Kang | ..................... H04N 23/62 |
| 10,264,174 B2 | 4/2019 | Kim et al. | |
| 10,578,948 B2 | 3/2020 | Shabtay et al. | |
| 11,847,808 B2 | 12/2023 | Park et al. | |
| 2007/0030375 A1 | 2/2007 | Ogasawara et al. | |
| 2015/0363670 A1 | 12/2015 | Sugishita et al. | |
| 2016/0227106 A1 | 8/2016 | Adachi | |
| 2016/0337598 A1 * | 11/2016 | Zaitsev | .................. H04N 23/61 |
| 2018/0091730 A1 * | 3/2018 | Nixon | ................. G06V 40/166 |
| 2018/0176461 A1 * | 6/2018 | Venetianer | ............. H04N 23/75 |
| 2018/0278737 A1 | 9/2018 | Posa | |
| 2019/0042839 A1 * | 2/2019 | Tomi | ..................... G06V 40/23 |
| 2019/0108388 A1 | 4/2019 | Rivard et al. | |
| 2020/0019213 A1 | 1/2020 | Lee | |
| 2020/0177797 A1 | 6/2020 | Liu et al. | |
| 2021/0201001 A1 | 7/2021 | Hu et al. | |
| 2023/0036861 A1 * | 2/2023 | Lum | ..................... H04M 3/568 |
| 2023/0059657 A1 | 2/2023 | Hu | |
| 2023/0071355 A1 | 3/2023 | Tamura et al. | |
| 2024/0320930 A1 * | 9/2024 | Ravasz | ................. G06T 19/006 |

OTHER PUBLICATIONS

Office Action dated Feb. 28, 2025, issued by Indian Patent Office in Indian Patent Application No. 202241005439.
International Search Report (PCT/ISA/210) and Written Opinion (PCT/ISA/237) issued by the International Searching Authority on May 8, 2023 in corresponding International Application No. PCT/KR2023/001416.

* cited by examiner

FIG. 3

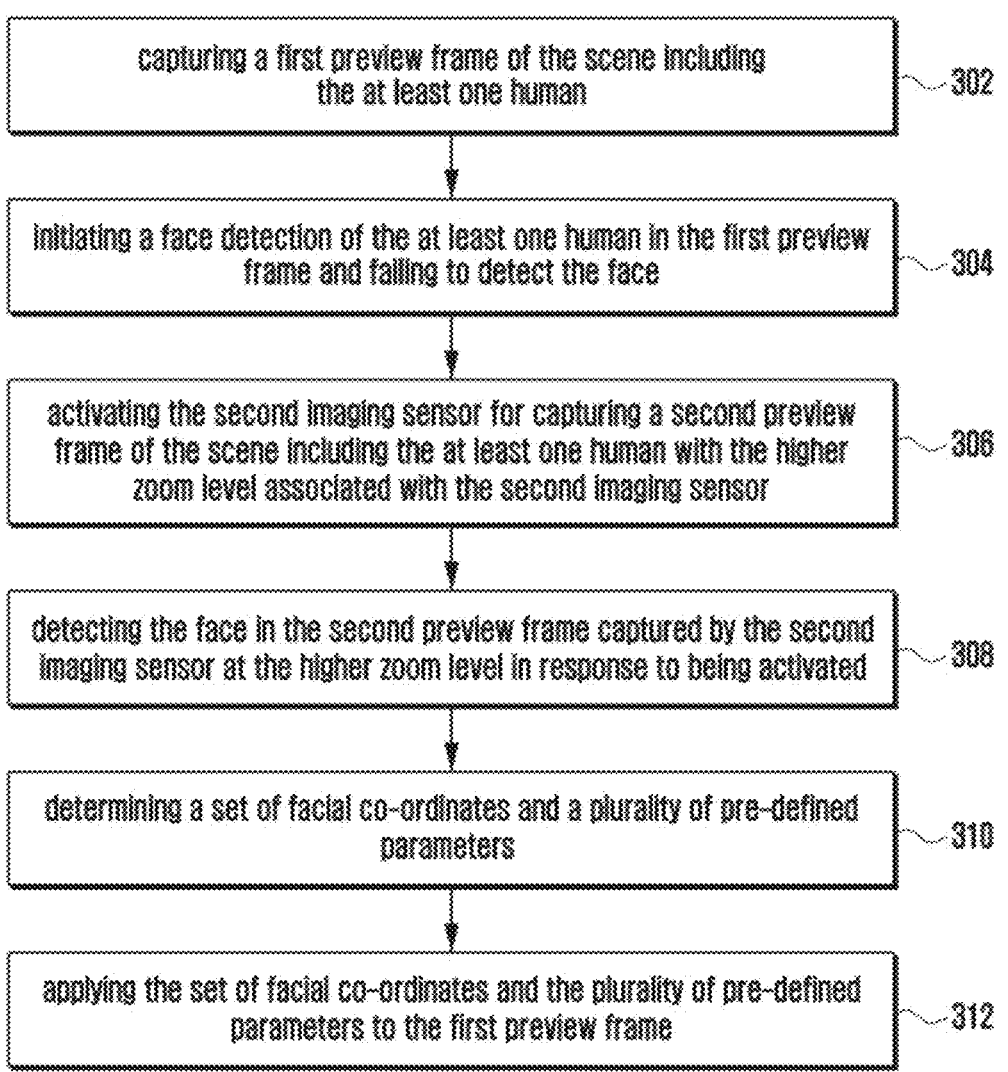

300 capturing a first preview frame of the scene including the at least one human — 302 initiating a face detection of the at least one human in the first preview frame and failing to detect the face — 304 activating the second imaging sensor for capturing a second preview frame of the scene including the at least one human with the higher zoom level associated with the second imaging sensor — 306 detecting the face in the second preview frame captured by the second imaging sensor at the higher zoom level in response to being activated — 308 determining a set of facial co-ordinates and a plurality of pre-defined parameters — 310 applying the set of facial co-ordinates and the plurality of pre-defined parameters to the first preview frame — 312

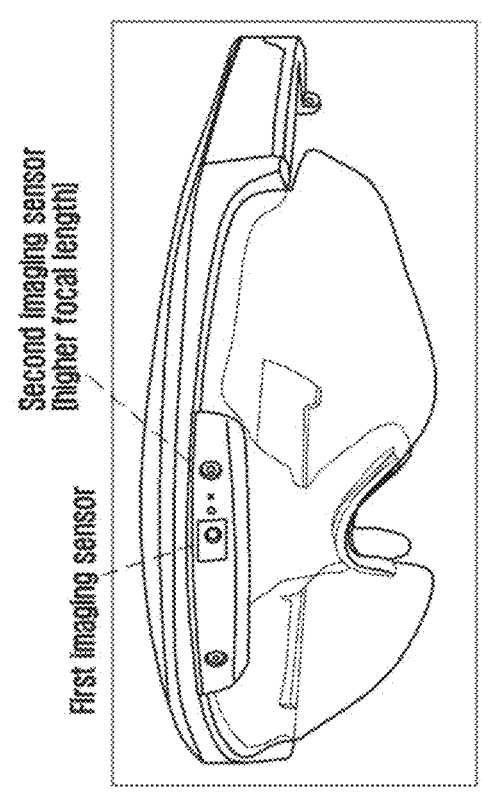
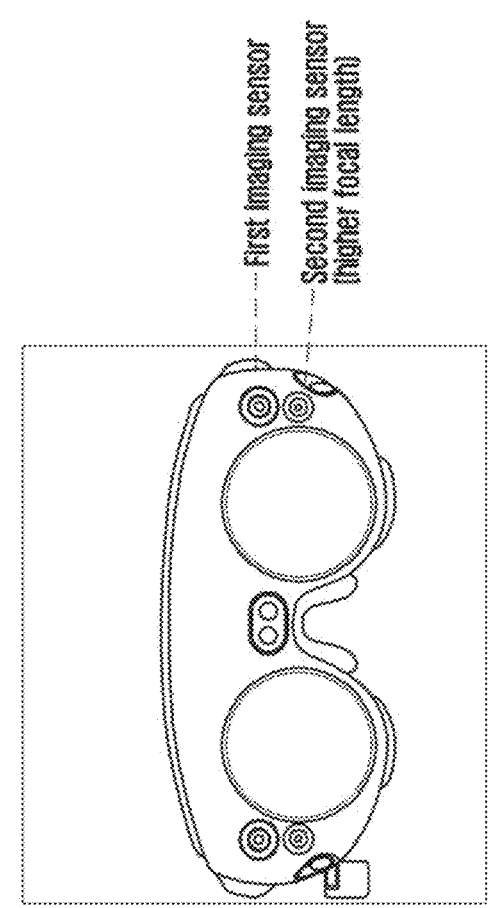
FIG. 5

FIG. 6

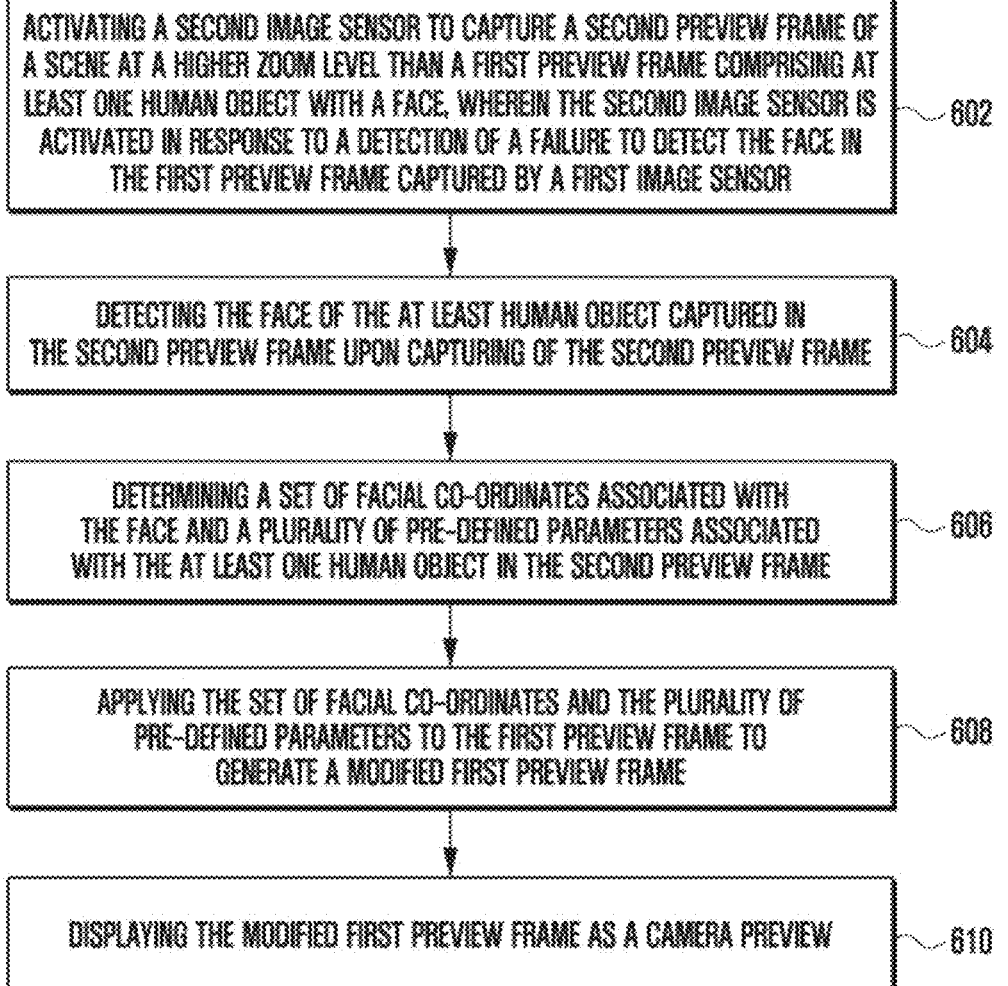

600

ACTIVATING A SECOND IMAGE SENSOR TO CAPTURE A SECOND PREVIEW FRAME OF A SCENE AT A HIGHER ZOOM LEVEL THAN A FIRST PREVIEW FRAME COMPRISING AT LEAST ONE HUMAN OBJECT WITH A FACE, WHEREIN THE SECOND IMAGE SENSOR IS ACTIVATED IN RESPONSE TO A DETECTION OF A FAILURE TO DETECT THE FACE IN THE FIRST PREVIEW FRAME CAPTURED BY A FIRST IMAGE SENSOR — 602

DETECTING THE FACE OF THE AT LEAST HUMAN OBJECT CAPTURED IN THE SECOND PREVIEW FRAME UPON CAPTURING OF THE SECOND PREVIEW FRAME — 604

DETERMINING A SET OF FACIAL CO-ORDINATES ASSOCIATED WITH THE FACE AND A PLURALITY OF PRE-DEFINED PARAMETERS ASSOCIATED WITH THE AT LEAST ONE HUMAN OBJECT IN THE SECOND PREVIEW FRAME — 606

APPLYING THE SET OF FACIAL CO-ORDINATES AND THE PLURALITY OF PRE-DEFINED PARAMETERS TO THE FIRST PREVIEW FRAME TO GENERATE A MODIFIED FIRST PREVIEW FRAME — 608

DISPLAYING THE MODIFIED FIRST PREVIEW FRAME AS A CAMERA PREVIEW — 610

METHOD AND SYSTEM FOR A FACE DETECTION MANAGEMENT

CROSS-REFERENCE TO RELATED APPLICATION(S)

This application is a continuation application, claiming priority under § 365(c), of an International application No. PCT/KR2023/001416, filed on Jan. 31, 2023, which is based on and claims the benefit of a Indian patent Provisional application No. 202241005439, filed on Feb. 1, 2022, in the Indian Intellectual Property Office, and of a Indian patent Non-Provisional application No. 202241005439, filed on Aug. 11, 2022, in the Indian Intellectual Property Office, the disclosure of each of which is incorporated by reference herein in its entirety.

BACKGROUND

1. Field

The disclosure generally relates to face detection. More specifically, the disclosure relates to methods and systems for face detection management in a multi-camera device.

2. Description of Related Art

Traditionally, most of the post processing solutions such as beautification, tone mapping, exposure control, low light enhancement etc. are applied based on the success of face detection. However, face detection only works at limited distances due to limitations of the algorithm & reduced accuracy.

Most smartphones do not support face detection beyond a certain distance (12 feet & greater) in live preview, capture, or video. The reason being that accuracy of face detection falls beyond a certain distance.

Related art solutions disclose methods for obtaining a first video frame image by a wide-angle camera in order to obtain a first detection result, and a second video frame image by a telephoto camera in order to obtain a second detection result. Further, the method may include updating a detection model according to the second detection result to improve the accuracy of the model.

Other related art solutions relate to methods to combine at least some of the wide and a tele image data in still mode to provide a fused output image from a particular point of view, and to provide continuous zoom video mode output images without fusion.

SUMMARY

In accordance with some example embodiments of the disclosure, a method implemented in a multi camera device for a face detection management is disclosed.

In accordance with some example embodiments of the disclosure, a implemented in a multi camera device for a face detection management is disclosed.

This summary is provided to introduce a selection of concepts, in a simplified format, that are further described in the detailed description of the disclosure. This summary is neither intended to identify key or essential inventive concepts of the disclosure and nor is it intended for determining the scope of the disclosure.

According to one or more example embodiments, a method implemented in a multi camera device for a face detection management, the method may include: based on a failure of detecting a face in a first preview frame captured by a first imaging sensor, while displaying the first preview frame as a camera preview, capturing a second preview frame using a second imaging sensor of a scene including at least one human with the face at a higher zoom level than the first preview frame; detecting the face in the second preview frame; determining a set of facial co-ordinates associated with the face and a plurality of pre-defined parameters associated with the at least one human; applying the set of facial co-ordinates and the plurality of pre-defined parameters to the first preview frame to generate a modified first preview frame; and displaying the modified first preview frame as the camera preview.

The face may be detected in the modified first preview frame.

The method of claim 1, further may include: receiving the first preview frame of the scene including the at least one human from the first imaging sensor; and detecting the failure of detecting the face of the at least one human in the first preview frame.

The second imaging sensor may be configured with a zoom level higher than a zoom level of the first imaging sensor.

Applying the set of facial co-ordinates and the plurality of pre-defined parameters to the first preview frame may include: re-mapping the set of facial co-ordinates and the plurality of pre-defined parameters to the first preview frame by adjusting a dimension of the set of facial co-ordinates and the plurality of pre-defined parameters with respect to the first preview frame; modifying the first preview frame by adjusting an exposure of the first preview frame; post-processing the face of the at least one human detected in the second preview frame; and generating the modified first preview frame. Post-processing the face may include: performing on the face, one or more of a face relighting by adjusting an exposure of the face, a face beautification, a skin-tone mapping, a low light frame enhancement based on the set of facial co-ordinates, a face focus tracking on the face, and a High Dynamic Range (HDR) processing of the first preview frame.

Detecting the failure of detecting the face may be based on one or more of: detecting a completion of a pre-determined period of time before detecting the face, wherein the pre-determined period of time initiates in response to receiving the first preview frame; and passing of a plurality of frames of the first preview frame before detecting the face, wherein the plurality of frames is pre-defined.

The failure of detecting the face may occur based on a distance between the at least one human and the first imaging sensor being greater than a pre-determined threshold distance.

The plurality of pre-defined parameters may include an exposure, a brightness, and a depth associated with the at least one human in the second preview frame.

According to one or more example embodiments, an electronic device may include: a first imaging sensor; a second imaging sensor; an Image Signaling Processor (ISP); a display; at least one memory storing instructions; and at least one processor operatively connected to the first imaging sensor, the second imaging sensor, the ISP, the display, and the at least one memory. The at least one processor is configured to execute the instructions to: based on a failure of detecting a face in a first preview frame captured by the first imaging sensor, while displaying the first preview frame as a camera preview, capture a second preview frame using the second imaging sensor of a scene including at least one human with the face at a higher zoom level than the first preview frame; detect the face in the second preview frame; determine a set of facial co-ordinates associated with the face and a plurality of pre-defined parameters associated with the at least one human; control the ISP to apply the set of facial co-ordinates and the plurality of pre-defined parameters to the first preview frame to generate a modified first preview frame; and control the display to display the modified first preview frame as the camera preview.

The face may be detected in the modified first preview frame.

The at least one processor may be further configured to execute the instructions to: receive the first preview frame of the scene including the at least one human from the first imaging sensor; and detect the failure of detecting the face of the at least one human in the first preview frame.

The second imaging sensor may be configured with a zoom level higher than a zoom level of the first imaging sensor.

The at least one processor may be further configured to execute the instructions to: re-map the set of facial co-ordinates and the plurality of pre-defined parameters to the first preview frame by adjusting a dimension of the set of facial co-ordinates and the plurality of pre-defined parameters with respect to the first preview frame; modify the first preview frame by adjusting an exposure of the first preview frame; post-process the face of the at least one human detected in the second preview frame; generate the modified first preview frame; and perform one the face, one or more of a face relighting by adjusting an exposure of the face, a face beautification, a skin-tone mapping, a low light frame enhancement based on the set of facial co-ordinates, a face focus tracking on the face, and a High Dynamic Range (HDR) processing of the first preview frame.

The at least one processor is further configured to execute the instructions to: detect a completion of a pre-determined period of time before detecting the face, wherein the pre-determined period of time initiates in response to receiving the first preview frame; and pass of a plurality of frames of the first preview frame before detecting the face, wherein the plurality of frames is pre-defined.

The failure of detecting the face may occur based on a distance between the at least one human and the first imaging sensor being greater than a pre-determined threshold distance.

The plurality of pre-defined parameters may include an exposure, a brightness, and a depth associated with the at least one human in the second preview frame.

According to one or more example embodiments, a non-transitory computer readable storage medium stores instructions that, when executed by at least one processor, cause the at least one processor to: based on a failure of detecting a face in a first preview frame captured by a first imaging sensor, while displaying the first preview frame as a camera preview, capture a second preview frame using a second imaging sensor of a scene including at least one human with the face at a higher zoom level than the first preview frame; detect the face in the second preview frame; determine a set of facial co-ordinates associated with the face and a plurality of pre-defined parameters associated with the at least one human; apply the set of facial co-ordinates and the plurality of pre-defined parameters to the first preview frame to generate a modified first preview frame; and display the modified first preview frame as the camera preview.

The face may be detected in the modified first preview frame.

The instructions, when executed by the at least one processor, may cause the at least one processor to: receive the first preview frame of the scene including the at least one human from the first imaging sensor; and detect the failure of detecting the face of the at least one human in the first preview frame.

The second imaging sensor may be configured with a zoom level higher than a zoom level of the first imaging sensor.

To further clarify advantages and features of the present disclosure, a more particular description of the disclosure will be rendered by reference to specific embodiments thereof, which is illustrated in the appended drawings. It is appreciated that these drawings depict only typical embodiments of the disclosure and are therefore not to be considered limiting of its scope. The disclosure will be described and explained with additional specificity and detail with the accompanying drawings.

In accordance with some example embodiments of the disclosure, accuracy of face detection is improved.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 3 illustrates an operational flow diagram depicting a process for a face management in an electronic device, in accordance with one or more embodiments of the disclosure.

FIG. 5 illustrates a use case depicting application of the system in an Augmented Reality (AR) glass, in accordance with one or more embodiments of the disclosure; and FIG. 6 illustrates a flow diagram depicting a method for face management in a multi camera device, in accordance with one or more embodiments of the disclosure.

Figure 1:
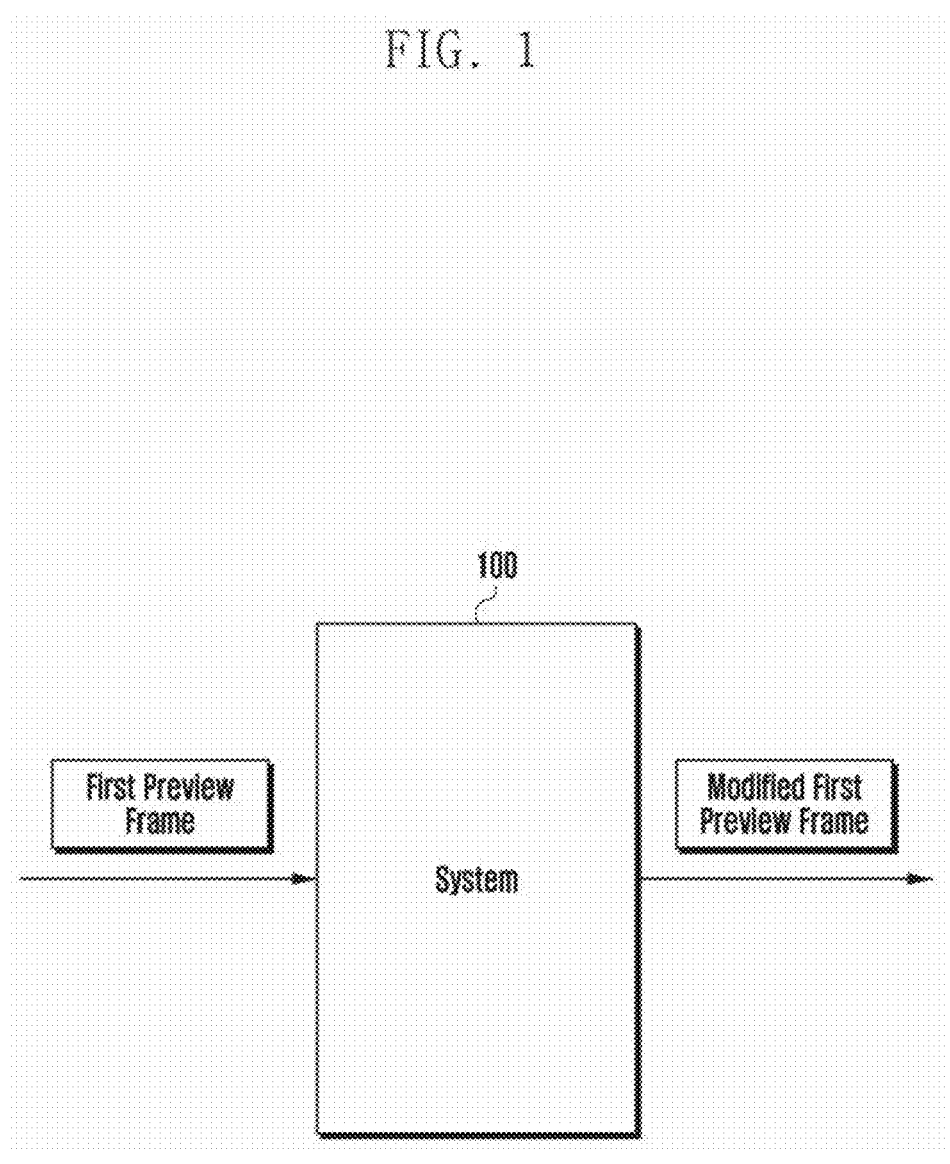
FIG. 1 illustrates a system for a face detection management, in accordance with one or more embodiments of the disclosure.

Further, skilled artisans will appreciate that elements in the drawings are illustrated for simplicity and may not have necessarily been drawn to scale. For example, the flow charts illustrate the method in terms of the most prominent operations involved to help to improve understanding of aspects of the present disclosure. Furthermore, in terms of the construction of the device, one or more components of the device may have been represented in the drawings by conventional symbols, and the drawings may show only those specific details that are pertinent to understanding the embodiments of the present disclosure so as not to obscure the drawings with details that will be readily apparent to those of ordinary skill in the art having benefit of the description herein.

DETAILED DESCRIPTION

For promoting an understanding of the principles of the disclosure, reference will now be made to the embodiment illustrated in the drawings and specific language will be used to describe the same. It will nevertheless be understood that no limitation of the scope of the disclosure is thereby intended, such alterations and further modifications in the illustrated system, and such further applications of the principles of the disclosure as illustrated therein being contemplated as would normally occur to one skilled in the art to which the disclosure relates.

It will be understood by those skilled in the art that the foregoing general description and the following detailed description are explanatory of the disclosure and are not intended to be restrictive thereof.

Reference throughout this specification to "an aspect", "another aspect" or similar language means that a particular feature, structure, or characteristic described in connection with the embodiment is included in at least one embodiment of the present disclosure. Thus, appearances of the phrase "in one or more embodiments", "in another embodiment" and similar language throughout this specification may, but do not necessarily, all refer to the same embodiment.

The terms "comprises", "comprising", or any other variations thereof, are intended to cover a non-exclusive inclusion, such that a process or method that comprises a list of operations does not include only those operations but may include other operations not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

Unless otherwise defined, all technical and scientific terms used herein have the same meaning as commonly understood by one of ordinary skilled in the art to which this disclosure belongs. The system, methods, and examples provided herein are illustrative only and not intended to be limiting.

Elements described as "module," "unit," "engine," or "part" may be physically implemented by analog and/or digital circuits including one or more of a logic gate, an integrated circuit, a microprocessor, a microcontroller, a memory circuit, a passive electronic component, an active electronic component, and the like.

FIG. 1 illustrates a system 100 for a face detection management, in accordance with one or more embodiments of the disclosure. The system 100 may be a multi-camera system implemented in an electronic device equipped with at least two cameras. In one or more embodiments, the electronic device may interchangeably be referred as a multi-camera device. The system 100 may be configured to manage a face detection by extending a range the face detection. The system 100 may be configured to detect a face of at least one human in a vicinity of the electronic device. Extending the range of face detection may be based on applying a zooming operation through the multi camera device for detecting the face. The range may be extended beyond a pre-determined distance. The zooming operation may be employed upon failure of the face detection of the at least one human in a first attempt by one of at least two cameras. Further, in response to extending the range, the system 100 may be configured to perform a mapping operation. The mapping operation may include mapping a number of facial co-ordinates captured after performing the zooming operation, onto a first preview frame on which the system 100 failed to detect the face.

In one or more embodiments, the electronic device may include the system 100. the electronic device may be the system 100. The system 100 is implemented in the electronic device and the multi camera device.

According to novel aspects of the disclosure, the system 100 configured to may be configured to activate a second imaging sensor to capture the second preview frame of a scene. The second preview frame may be captured at a higher zoom level than a first preview frame. The first preview frame may include the at least one human with the face. The second imaging sensor may be activated to capture the second preview frame in response to a detection by the system 100 with respect to the first preview frame. The detection may be that the system 100 failed to detect the face in the first preview frame captured by the first imaging sensor.

In response to activating the second imaging sensor, the system 100 may be configured to capture the second preview frame. The second preview frame may include the at least one human. Upon capturing the second preview frame, the system 100 may be configured to detect the face of the at least one human in the second preview frame.

Subsequent to detecting the face of the at least one human, the system 100 may be configured to determine a set of facial co-ordinates and a number of pre-defined parameters. The set of facial co-ordinates may be related to the face of the at least one human. The number of pre-defined parameters may be related to the at least one human in the second preview frame.

In response to determining the set of facial co-ordinates and the number of pre-defined parameters, the system 100 may be configured to generate a modified first preview frame. The modified first preview frame may be generated by the system 100 may applying the set of facial co-ordinates and the number of pre-defined parameters to the first preview frame.

The system 100 may be configured to display the modified first preview frame as a camera preview.

Figure 2:
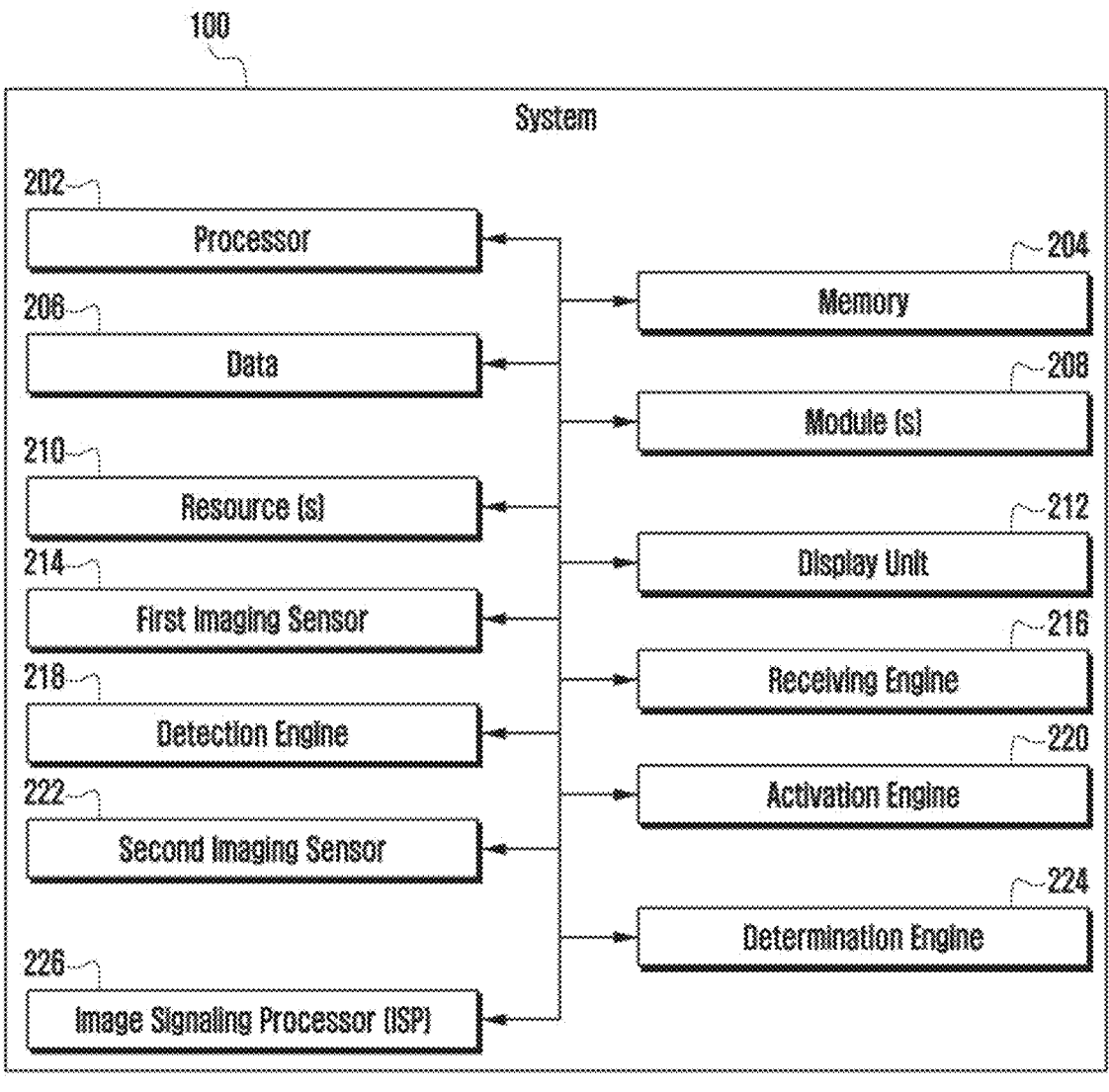
FIG. 2 illustrates a schematic block diagram of the system configured to manage a face detection, in accordance with one or more embodiments of the disclosure.

FIG. 2 illustrates a schematic block diagram of the system 100 configured to manage a face detection, in accordance with one or more embodiments of the disclosure. The system 100 may be a multi-camera system implemented in an electronic device equipped with at least two cameras. The system 100 may be configured to extend a range of the face detection to detect a face of at least one human in a vicinity of the electronic device. The system 100 may be configured to apply a zoom operation through the electronic device for detecting the face of the at least one human. The system 100 may be configured to detect a failure in detecting the face in a first attempt. Upon detecting the failure, the system 100 may be configured to deploy the zoom operation for detecting the face of the at least one human.

The system 100 may include (at least one) processor 202, (at least one) memory 204, data 206, module(s) 208, resource(s) 210, a display 212, a first imaging sensor 214, a receiving engine 216, a detection engine 218, an activation engine 220, a second imaging sensor 222, a determination engine 224, and an Image Signaling Processor 226. The processor may be operatively connected to the other components in the system.

In one or more embodiments, the electronic device may include the system 100. The electronic device may be the system 100. The system 100 is implemented in the electronic device and the multi camera device. The electronic device may include: a processor 202, a memory 204, data 206, module(s) 208, resource(s) 210, a display 212, a first imaging sensor 214, a receiving engine 216, a detection engine 218, an activation engine 220, a second imaging sensor 222, a determination engine 224, and an Image Signaling Processor 226. The multi camera device may include a processor 202, a memory 204, data 206, module(s) 208, resource(s) 210, a display 212, a first imaging sensor 214, a receiving engine 216, a detection engine 218, an activation engine 220, a second imaging sensor 222, a determination engine 224, and an Image Signaling Processor 226.

In one or more embodiments, the processor 202 may include the receiving engine 216, the detection engine 218, the activation engine 220 and determination engine 224.

In one or more embodiments, the processor 202, the memory 204, the data 206, the module(s) 208, the resource(s) 210, the display 212, the first imaging sensor 214, the receiving engine 216, the detection engine 218, the activation engine 220, the second imaging sensor 222, the determination engine 224, the ISP 226 may be communicatively coupled to one another.

As would be appreciated, the system 100, may be understood as one or more of a hardware, a software, a logic-based program, a configurable hardware, and the like. In an example, the (at least one) processor 202 may be a single processing unit or a number of units, all of which could include multiple computing units. The processor 202 may be implemented as one or more microprocessors, microcomputers, microcontrollers, digital signal processors, central processing units, processor cores, multi-core processors, multiprocessors, state machines, logic circuitries, application-specific integrated circuits, field-programmable gate arrays and/or any devices that manipulate signals based on operational instructions. Among other capabilities, the processor 202 may be configured to fetch and/or execute computer-readable instructions and/or data stored in the memory 204.

In one or more embodiments, the electronic device may include the first imaging sensor 214, the second imaging sensor 222, the Image Signaling Processor (ISP) 226, the display 212 and the processor 202.

In one or more embodiments, the processor 202 may be configured to capture a second preview frame of a scene at a higher zoom level than the first preview frame including at least one human with the face using a second imaging sensor 222 when a face detecting fails in a first preview frame captured by a first imaging sensor 214, while displaying the first preview frame as a camera preview.

In one or more embodiments, the processor 202 may be configured to detect the face of the at least one human captured in the second preview frame.

In one or more embodiments, the processor 202 may be configured to determine a set of facial co-ordinates associated with the face and a plurality of pre-defined parameters associated with the at least one human in the second preview frame.

In one or more embodiments, the processor 202 may be configured to control the ISP 226 to apply the set of facial co-ordinates and the plurality of pre-defined parameters to the first preview frame to generate a modified first preview frame.

In one or more embodiments, the processor 202 may be configured to control the display 212 to display the modified first preview frame as the camera preview.

In one or more embodiments, the processor 202 may be configured to receive the first preview frame of the scene comprising the at least one human from the first imaging sensor 214.

In one or more embodiments, the processor 202 may be configured to detect the failure to detect the face of the at least one human in the first preview frame.

In one or more embodiments, the second imaging sensor 222 is configured with a zoom level higher than a zoom level of the first imaging sensor 214.

In one or more embodiments, the processor 202 may be configured to re-map the set of facial co-ordinates and the plurality of pre-defined parameters to the first preview frame by adjusting a dimension of the set of facial co-ordinates and the plurality of pre-defined parameters with respect to the first preview frame.

In one or more embodiments, the processor 202 may be configured to modify the first preview frame by adjusting an exposure of the first preview frame.

In one or more embodiments, the processor 202 may be configured to post-process the face of the at least one human detected in the second preview frame.

In one or more embodiments, the processor 202 may be configured to generate the modified first preview frame.

In one or more embodiments, the processor 202 may be configured to perform one the face, one or more of a face relighting by adjusting the exposure of the face, a face beautification, a skin-tone mapping, a low light frame enhancement based on the set of facial co-ordinates, a face focus tracking on the face, and a High Dynamic Range (HDR) processing of the first preview frame.

In one or more embodiments, the processor 202 may be configured to detect a completion of a pre-determined period of time before detecting the face, wherein the pre-determined period of time initiates in response to receiving the first preview frame.

In one or more embodiments, the processor 202 may be configured to pass of a plurality of frames of the first preview frame before detecting the face, wherein the plurality of frame is pre-defined.

In an example, the memory 204 may include any non-transitory computer-readable medium known in the art including, for example, volatile memory, such as static random access memory (SRAM) and/or dynamic random access memory (DRAM), and/or non-volatile memory, such as read-only memory (ROM), erasable programmable ROM (EPROM), flash memory, hard disks, optical disks, and/or magnetic tapes. The memory 204 may include the data 206. The data 206 serves, amongst other things, as a repository for storing data processed, received, and generated by one or more of the processor 202, the memory 204, the module(s) 208, the resource(s) 210, the display 212 the first imaging sensor 214, the receiving engine 216, the detection engine 218, the activation engine 220, the second imaging sensor 222, the determination engine 224, the ISP 226.

The module(s) 208, amongst other things, may include routines, programs, objects, components, data structures, etc., which perform particular tasks or implement data types. The module(s) 208 may also be implemented as, signal processor(s), state machine(s), logic circuitries, and/or any other device or component that manipulate signals based on operational instructions.

Further, the module(s) 208 may be implemented in hardware, as instructions executed by at least one processing unit, e.g., processor 202, or by a combination thereof. The processing unit may be a general-purpose processor that executes instructions to cause the general-purpose processor to perform operations or, the processing unit may be dedicated to performing the required functions. In another aspect of the present disclosure, the module(s) 208 may be machine-readable instructions (software) which, when executed by a processor/processing unit, may perform any of the described functionalities.

In some example embodiments, the module(s) 208 may be machine-readable instructions (software) which, when executed by a processor 202/processing unit, perform any of the described functionalities.

The resource(s) 210 may be physical and/or virtual components of the system 100 that provide inherent capabilities and/or contribute towards the performance of the system 100. Examples of the resource(s) 210 may include, but are not limited to, a memory (e.g., the memory 204), a power unit (e.g., a battery), a display unit (e.g., the display 212) etc. The resource(s) 210 may include a power unit/battery unit, a network unit, etc., in addition to the processor 202, and the memory 204.

The display 212 may display various types of information (for example, media contents, multimedia data, text data, etc.) to the system 100. The display 212 may include, but is not limited to, a liquid crystal display (LCD), a light-emitting diode (LED) display, an organic LED (OLED) display, a plasma cell display, an electronic ink array display, an electronic paper display, a flexible LCD, a flexible electrochromic display, and/or a flexible electrowetting display.

In an example, the first imaging sensor 214, the receiving engine 216, the detection engine 218, the activation engine 220, the second imaging sensor 222, the determination engine 224, the ISP 226, amongst other things, include routines, programs, objects, components, data structures, etc., which perform particular tasks or implement data types. The first imaging sensor 214, the second imaging sensor 222, the receiving engine 216, the activation engine 220, the detection engine 218, the determination engine 224, the ISP 226 may also be implemented as, signal processor(s), state machine(s), logic circuitries, and/or any other device or component that manipulate signals based on operational instructions. Further, the first imaging sensor 214, the second imaging sensor 222, the receiving engine 216, the activation engine 220, the detection engine 218, the determination engine 224, the ISP 226 can be implemented in hardware, instructions executed by a processing unit, or by a combination thereof. The processing unit can comprise a computer, a processor, such as the processor 202, a state machine, a logic array or any other suitable devices capable of processing instructions. The processing unit can be a general-purpose processor which executes instructions to cause the general-purpose processor to perform the required tasks or, the processing unit can be dedicated to performing the required functions.

The first imaging sensor 214 may be a first camera amongst the at least two cameras in the electronic device. The first imaging sensor 214 may be configured to capture a first preview frame of a scene of an environment. The first preview frame may include the at least one human in a vicinity of the environment captured by the first imaging sensor 214. In response to capturing the first preview frame, the first imaging sensor 214 may be configured to transmit the first preview frame. The second imaging sensor 222 may be a second camera amongst the at least two cameras in the electronic device.

Subsequent to a capture of the first preview frame by the first imaging sensor 214, the receiving engine 216 may be configured to receive the first preview frame from the first imaging sensor 214. In one or more embodiments, the first imaging sensor 214 may interchangeably be referred as wide sensor.

The detection engine 218 may be configured to detect the face of the at least one human in the first preview frame. In one or more embodiments, the detection engine 218 may fail to detect the face of the at least one human in the first preview frame. The detection engine 218 may be configured to detect the failure to perform a successful face detection of the face of the at least one human in the first preview frame. In one or more embodiments, failure in detecting the face may occur when a distance between the at least one human and the first imaging sensor 214 is greater than a pre-determined threshold distance. The detection engine 218 may be configured to detect the failure of the face detection in a number of scenarios. In one or more embodiments, where it is determined by the detection engine 218 that a pre-determined period of time is completed before detecting the face, the detection engine 218 may detect it as the failure for detecting the face. The pre-determined period of time may be initiated in response to receiving the first preview frame. In one or more embodiments, where it is determined by the detection engine 218, a number of frames of the first preview frame passed before detection of the face, the detection engine 218 may detect it as the failure for detecting the face. In one or more embodiments, the number of frames may be pre-defined.

In response to a detection of the failure, the activation engine 220 may be configured to activate the second imaging sensor 222. The activation engine 220 may be configured to receive a command from the detection engine 218 for activating the second imaging sensor 222. In one or more embodiments, the second imaging sensor 222 may interchangeably be referred as a tele sensor. The detection engine 218 may only transmit the command when it is determined that the face detection of the face of the at least one human in first preview frame is unsuccessful.

Subsequently, the second imaging sensor 222 may be configured to capture a second preview frame of the scene in response to being activated. The second imaging sensor 222 may be configured with a higher zoom level with respect to a zoom level associated with the first imaging sensor 214. The second imaging sensor 222 may capture the second preview frame at the higher zoom level than the first preview frame captured by the first imaging sensor 214. The second preview frame of the scene may also include the at least one human in the environment. The higher zoom level may be applied as a consequence to failure of the face detection in the first preview frame. The zoom level may assist in focusing on the face of the at least one human more with respect to the first preview frame.

Subsequent to a capture of the second preview frame by the second imaging sensor 222, the detection engine 218 may be configured to detect the face of the at least one human in the second preview frame captured by the second imaging sensor 222.

The determination engine 224 may be configured to determine a set of facial co-ordinates and a number of pre-defined parameters. The set of facial co-ordinates may be associated with the face and the number of pre-defined parameters may be associated with the at least one human in the second preview frame captured by the second imaging sensor 222. Examples of the number of pre-defined parameters may include, but are not limited to, an exposure, a brightness, and a depth associated with the at least one human in the second preview frame.

Subsequent to determination of the set of facial co-ordinates and the number of pre-defined parameters, the ISP 226 may be configured to apply the set of facial co-ordinates and the number of pre-defined parameters to the first preview frame. The set of facial co-ordinates and the number of pre-defined parameters may be applied to generate a modified first preview frame such that the face may be detected in the modified first preview frame. For applying the set of facial co-ordinates and the number of pre-defined parameters, the ISP 226 may be configured to adjust a dimension of the set of facial co-ordinates and the number of pre-defined parameters with respect to the first preview frame. Based on the adjustment, the ISP 226 may be configured to re-mapping the set of facial co-ordinates and the number of pre-defined parameters to the first preview frame, the ISP 226 may be configured to compensate for over saturation of background in the first preview frame. To compensate for over saturation of background, the ISP 226 may be configured to adjust the exposure curves keeping the face region exposure unaffected. the ISP 226 may be configured to send to Adaptive Tone Mapping (ATM) to compensate for over saturation of background in the first preview frame. To compensate for over saturation of background, the Adaptive Tone Mapping (ATM) may be configured to adjust the exposure curves keeping the face region exposure unaffected.

Upon re-mapping, the ISP 226 may be configured to adjust an exposure of the first preview frame for modifying the first preview frame. Further, the ISP 226 may be configured to perform a post-processing on the face of the at least one human detected in the second preview frame. The post processing may include performing on the face, one or more of a face relighting by adjusting the exposure of the face, a face beautification, a skin-tone mapping, a low light frame enhancement based on the set of facial co-ordinates, a face focus tracking on the face, and a High Dynamic Range (HDR) processing of the first preview frame. Furthermore, the ISP 226 may be configured to generate the modified first preview frame including the face.

FIG. 3 illustrates an operational flow diagram depicting a process 300 for a face management in an electronic device, in accordance with one or more embodiments of the disclosure. The process 300 may be performed by the system as referred in the FIG. 1 and FIG. 2. The face management may include detecting a face of at least one human present in a scene captured by the electronic device. The electronic device may be a multi camera device with at least two cameras. The at least two cameras may be the first imaging sensor 214 and the second imaging sensor 222 as referred in the FIG. 2. The second imaging sensor 222 may be configured to detect the face in response to a failure of the first imaging sensor to detect the face. The second imaging sensor 222 may be configured with a zoom level higher than the first imaging sensor 214. The second imaging sensor 222 may be configured to detect the face when the at least one human is at distance of 12 feet or above.

At operation 302, the process 300 may include capturing a first preview frame of the scene including the at least one human. The first preview frame may be captured by the first imaging sensor 214. The first preview frame may include the at least one human in a vicinity of the environment captured by the first imaging sensor 214. In response to capturing the first preview frame, the process 300 may include transmitting the first preview frame to the receiving engine 216 and the receiving engine 216 may transmit the first preview frame to the detection engine 218 as referred in the FIG. 2.

At operation 302, the process 300 may further include displaying the first preview frame as a camera preview.

At operation 304, the process 300 may include initiating a face detection of the at least one human in the first preview frame and failing to detect the face. The failure in detecting the face may occur when a distance between the at least one human and the first imaging sensor 214 is greater than a pre-determined threshold distance. The process 300 may include detecting the failure when a pre-determined period of time is completed before detecting the face or a number of frames of the first preview frame passed before detection of the face. The pre-determined period of time may be initiated in response to receiving the first preview frame. In one or more embodiments, the number of frames may be pre-defined.

At operation 306, the process 300 may include activating the second imaging sensor 222 for capturing a second preview frame of the scene including the at least one human with the higher zoom level associated with the second imaging sensor 222. The second imaging sensor 222 may be activated by the activation engine 220 as referred in the FIG. 2. Further, the second imaging sensor 222 may capture the second preview frame including the face of the at least on human. The higher zoom level may be applied as a consequence to failure of the face detection in the first preview frame. The zoom level may assist in focusing on the face of the at least one human more with respect to the first preview frame.

At operation 306, the process 300 may include capturing the second preview frame of a scene at a higher zoom level than the first preview frame including at least one human with the face using a second imaging sensor 222 when a face detecting fails in a first preview frame captured by a first imaging sensor 214, while displaying the first preview frame as a camera preview.

At operation 308, the process 300 may include detecting the face in the second preview frame captured by the second imaging sensor 222 at the higher zoom level in response to being activated. The face of the at least one human may be detected in the second preview frame at frame rate of 30 frames per second. The detection may be performed by the detection engine 218 as referred in the FIG. 2. Further, prior to detection, the detection engine 218 may be configured to receive the second preview frame from the second imaging sensor 222 via the receiving engine 216.

At operation 310, the process 300 may include determining a set of facial co-ordinates and a number of pre-defined parameters. The set of facial co-ordinates may be associated with the face and the number of pre-defined parameters may be associated with the at least one human in the second preview frame captured by the second imaging sensor 222. The determination may be performed by the determination engine 224 as referred in the FIG. 2. Examples of the number of pre-defined parameters may include, but are not limited to, an exposure, a brightness, and a depth associated with the at least one human in the second preview frame.

At operation 312, the process 300 may proceed towards applying the set of facial co-ordinates and the number of pre-defined parameters to the first preview frame. The set of facial co-ordinates and the number of pre-defined parameters may be applied by the ISP 226 as referred in the FIG. 2. The set of facial co-ordinates and the number of pre-defined parameters may be applied to generate a modified first preview frame such that the face may be detected in the modified first preview frame. For applying set of facial co-ordinates and the number of pre-defined parameters, the process 300 may include adjusting a dimension of the set of facial co-ordinates and the number of pre-defined parameters with respect to the first preview frame. Further, the process 300 may proceed towards re-mapping the set of facial co-ordinates and the number of pre-defined parameters to the first preview frame. The process 300 may include adjust an exposure of the first preview frame for modifying the first preview frame.

Moving ahead, applying the set of facial co-ordinates and the number of pre-defined parameters, may include post-processing the face of the at least one human detected in the second preview frame by performing one or more of a face relighting by adjusting the exposure of the face, a white balance correction, a face beautification, a bokeh effect by keeping the face is in focus and keeping a background blurred, a skin-tone mapping, a low light frame enhancement based on the set of facial co-ordinates, a face focus tracking on the face, and a High Dynamic Range (HDR) processing of the first preview frame on the face.

In one or more embodiments, adjusting the exposure may be based on setting different metering mode of the second imaging sensor 222 for helping the second imaging sensor 222 for metering light and estimate an exposure. The metering may be one of a center-weighted metering, a spot metering, a partial metering and a matrix metering.

Further, the center-weighted metering may work on an assumption that the most important part of an image is probably in the center and may measure an intensity of the light of the scene along with placing an extra emphasis on the light values in center of the image. The spot metering may include measuring the intensity of light from a small circle such as 2% of a total image area in the center of the scene. Subsequently, the partial metering may include measuring an intensity of the light from a circle such as 10% of the total image area or a focus region or a focus rectangle in the center of the scene. The matrix metering may include obtaining a matrix upon identifying dissimilar zones in the scene. An average of light intensity may be computed and the exposure may be adjusted accordingly.

Subsequently, the white balance correction may include adjusting colors so that the image looks natural. If a white object is illuminated with a low color temperature light source, the object in the captured image may have a reddish tint. If the white object is illuminated with a high color temperature light source, the object in the captured image may appear somewhat blue instead of pure white. A trick to choose a correct white balance value is to estimate the "Light source type" & set the appropriate "kelvin" value in look up table approach.

TABLE 1

| DEGREES KELVIN | LIGHT SOURCE |
| --- | --- |
| 1700-1800K | Match Flame |
| 1850-1930K | Candle Flame |
| 2000-3000K | Sun(Sunrise or Sunset) |
| 2500-2900K | Tungsten light bulb |
| 3000K | Tungsten Lamp 500 W-1K |
| 3200-3500K | Quartz Light |
| 3200-7500K | Fluorescent Light |
| 3275K | Tungsten Lamp 2K |
| 3380K | Tungsten Lamp 5K, 10K |
| 5000-5400K | Direct Sun(Noon) |
| 5500-6500K | Daylight Sun(Sun & Sky) |
| 5500-6500K | Defused Sun(Cloudy/Hazy) |
| 6000-7500K | Sky(Overcast) |
| 6500K | RGB Monitor (White Point) |
| 7000-8000K | Shade |
| 8000-10,000K | Sky(Partly Cloudy) |

Table 1 depicts a common look up chart used to map the "light source type" with temperature in Kelvin.

Further, the auto focus may also me adjusted by turning off an "auto focus" feature and applying a point focus on the set of facial co-ordinates. In one or more embodiments, adjusting the exposure, the auto focus, and the white balance may also be referred as a 3A exposure technique. The 3A exposure technique includes the auto focus, an auto white balance, and an auto exposure.

At operation 314, the process 300 may include generating a modified first preview frame including the face.

At operation 314, the process 300 may display the modified first preview frame as a camera preview.

At operation 314, when displaying the modified first preview as the camera preview, the process 300 may highlight an area corresponding to the face within the displayed camera preview on the display 212. The highlighted area may include a face focus box. The face focus box may include a user interface indicating the face area within the camera preview.

Figure 4:
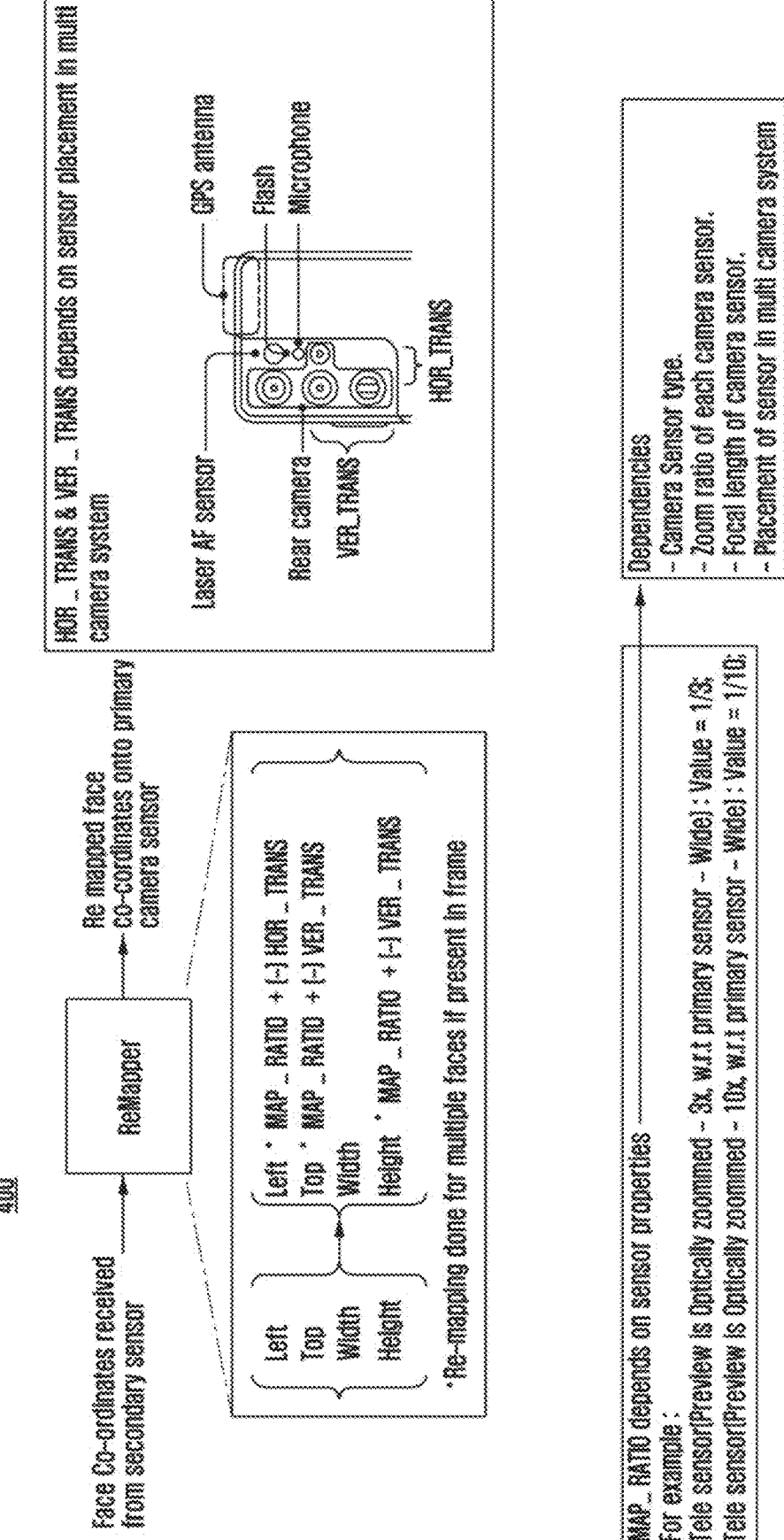
FIG. 4 illustrates an operational flow diagram depicting a process depicting a re-mapping of a set of facial co-ordinates and a plurality of pre-defined parameters to a first preview frame, in accordance with one or more embodiments of the disclosure.

FIG. 4 illustrates an operational flow diagram depicting a process 400 depicting a re-mapping of a set of facial co-ordinates and a number of pre-defined parameters to a first preview frame, in accordance with one or more embodiments of the disclosure. The set of facial co-ordinates may be associated with a face of at least one human and the number of pre-defined parameters may be associated with associated with the at least one human captured in a second preview frame. The number of pre-defined parameters may include an exposure, a brightness, and a depth associated with the at least one human in the second preview frame. The re-mapping may be required as a position of the face and the set of facial co-ordinates detected in the second preview frame may be at a different scale with respect to the first preview frame.

In one or more embodiments, the re-mapping may include computing a correct set of facial co-ordinates on the first imaging sensor 214. In one or more embodiments, the re-mapping and a mapping ratio also referred as "MAP-RATIO" may depend on a number of properties of the first imaging sensor 214 and the second imaging sensor 222. The number of properties may include a type of the first imaging sensor 214 and the second imaging sensor 222, a zoom ratio of the first imaging sensor 214 and the second imaging sensor 222, a focal length associated with the first imaging sensor 214 and the second imaging sensor 222, and a placement of the first imaging sensor 214 and the second imaging sensor 222 in the electronic device. In one or more embodiments, the mapping ratio may be as described below:

Tele sensor (Preview is Optically zoomed—3×, w.r.t primary sensor—Wide): Value=1/3;

Tele sensor (Preview is Optically zoomed—10×, w.r.t primary sensor—Wide): Value=1/10;

In one or more embodiments, the re-mapping may be performed for generating a modified first preview frame by the ISP 226 as referred in the FIG. 2. The modified first preview frame may include the face of the at least one human. The face may be detected in a second preview frame captured by the second imaging sensor 222 in response to a failure of detecting the face in a first preview frame captured by the first imaging sensor 214 as referred in the FIG. 2. In one or more embodiments, the set of facial co-ordinates and the number of pre-defined parameters may be determined from the second preview frame. The determination may be performed by the determination engine 224 as referred in the FIG. 2.

FIG. 5 illustrates a use case 500 depicting application of the system 100 in an Augmented Reality (AR) glass, in accordance with one or more embodiments of the disclosure. If multiple cameras are present in gadgets such as AR, as shown in the FIG. 5, a method proposed in the disclosure may be employed to extend a range of face detection by translating and mapping face co-ordinates from one sensor preview onto another sensor preview.

FIG. 6 illustrates a flow diagram depicting a method 600 for face management in a multi camera device, in accordance with one or more embodiments of the disclosure. The method 600 may be implemented by the system 100 using components thereof, as described above. In one or more embodiments, the method 600 may be executed by first imaging sensor 214, the second imaging sensor 222, the receiving engine 216, the activation engine 220, the detection engine 218, the determination engine 224, the ISP 226. Further, for the sake of brevity, details of the present disclosure that are explained in detail in the description of FIG. 1 to FIG. 5 are not explained in detail in the description of FIG. 6.

At operation 602, the method 600 includes, activating a second imaging sensor to capture a second preview frame of a scene at a higher zoom level than a first preview frame comprising at least one human with a face, wherein the second imaging sensor is activated in response to a detection of a failure to detect the face in the first preview frame captured by a first imaging sensor.

At operation 602, the method 600 may include capturing the second preview frame of a scene at a higher zoom level than the first preview frame including at least one human with the face using a second imaging sensor 222 when a face detecting fails in a first preview frame captured by a first imaging sensor 214, while displaying the first preview frame as a camera preview At operation 604, the method 600 includes, detecting the face of the at least one human captured in the second preview frame upon capturing of the second preview frame.

At operation 606, the method 600 includes, determining a set of facial co-ordinates associated with the face and a plurality of pre-defined parameters associated with the at least one human in the second preview frame.

At operation 608, the method 600 includes, applying the set of facial co-ordinates and the plurality of pre-defined parameters to the first preview frame to generate a modified first preview frame; and At operation 610, the method 600 includes, displaying the modified first preview frame as a camera preview.

At operation 610, the method 600 includes, when displaying the modified first preview as the camera preview, highlighting an area corresponding to the face within the displayed camera preview on the display 212. The highlighted area may include a face focus box. The face focus box may include a user interface indicating the face area within the camera preview.

While specific language has been used to describe the present disclosure, any limitations arising on account thereto, are not intended. As would be apparent to a person in the art, various working modifications may be made to the method to implement the inventive concept as taught herein. The drawings and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment.

While certain embodiments of the disclosure has been particularly shown and described, it will be understood that various changes in form and details may be made therein without departing from the spirit and scope of the following claims.

What is claimed is:

1. A method implemented in a multi camera device for a face detection management, the method comprising:
   based on a failure of detecting a face in a first preview frame captured by a first camera, while displaying the first preview frame as a camera preview, capturing a second preview frame using a second camera of a scene comprising at least one human with the face at a higher zoom level than the first camera;
   detecting the face in the second preview frame;
   determining, from the second preview frame, a set of facial co-ordinates associated with the face and a plurality of pre-defined parameters associated with the at least one human; and
   applying the set of facial co-ordinates and the plurality of pre-defined parameters to the first preview frame to display a modified first preview frame as the camera preview.

2. The method of claim 1, wherein the face is detected in the modified first preview frame.

3. The method of claim 1, further comprises:
   receiving the first preview frame of the scene comprising the at least one human from the first camera; and
   detecting the failure of detecting the face of the at least one human in the first preview frame.

4. The method of claim 1, wherein a second imaging sensor of the second camera is configured with a zoom level higher than a zoom level of the first imaging sensor of the first camera.

5. The method of claim 1, wherein applying the set of facial co-ordinates and the plurality of pre-defined parameters to the first preview frame comprises:
   re-mapping the set of facial co-ordinates and the plurality of pre-defined parameters to the first preview frame by adjusting a dimension of the set of facial co-ordinates and the plurality of pre-defined parameters with respect to the first preview frame;
   modifying the first preview frame by adjusting an exposure of the first preview frame;
   post-processing the face of the at least one human detected in the second preview frame; and
   generating the modified first preview frame, and
   wherein post-processing the face comprises:
   performing on the face, one or more of a face relighting by adjusting an exposure of the face, a face beautification, a skin-tone mapping, a low light frame enhancement based on the set of facial co-ordinates, a face focus tracking on the face, and a High Dynamic Range (HDR) processing of the first preview frame.

6. The method of claim 1, wherein detecting the failure of detecting the face is based on one or more of:
   detecting a completion of a pre-determined period of time before detecting the face, wherein the pre-determined period of time initiates in response to receiving the first preview frame; and
   passing of a plurality of frames of the first preview frame before detecting the face, wherein the plurality of frames is pre-defined.

7. The method of claim 1, wherein the failure of detecting the face occurs based on a distance between the at least one human and the first camera being greater than a pre-determined threshold distance.

8. The method of claim 1, wherein the plurality of pre-defined parameters comprises an exposure, a brightness, and a depth associated with the at least one human in the second preview frame.

9. An electronic device comprising:
a first camera including a first imaging sensor;
a second camera including a second imaging sensor;
an Image Signaling Processor (ISP);
a display;
at least one memory storing instructions; and
at least one processor operatively connected to the first camera, the second camera, the ISP, the display, and the at least one memory, wherein the processor is configured to execute the instructions to:
based on a failure of detecting a face in a first preview frame captured by the first camera, while displaying the first preview frame as a camera preview, capture a second preview frame using the second camera of a scene comprising at least one human with the face at a higher zoom level than the first camera;
detect the face in the second preview frame;
determine, from the second preview frame, a set of facial co-ordinates associated with the face and a plurality of pre-defined parameters associated with the at least one human; and
control the ISP to apply the set of facial co-ordinates and the plurality of pre-defined parameters to the first preview frame to display the modified first preview frame as the camera preview.

10. The electronic device of claim 9, wherein the face is detected in the modified first preview frame.

11. The electronic device of claim 9, wherein the at least one processor is further configured to execute the instructions to:
receive the first preview frame of the scene comprising the at least one human from the first imaging sensor; and
detect the failure of detecting the face of the at least one human in the first preview frame.

12. The electronic device of claim 11, wherein the at least one processor is further configured to execute the instructions to:
detect a completion of a pre-determined period of time before detecting the face, wherein the pre-determined period of time initiates in response to receiving the first preview frame; and
pass of a plurality of frames of the first preview frame before detecting the face, wherein the plurality of frames is pre-defined.

13. The electronic device of claim 9, wherein the second imaging sensor is configured with a zoom level higher than a zoom level of the first imaging sensor.

14. The electronic device of claim 9, wherein the at least one processor is further configured to execute the instructions to:
re-map the set of facial co-ordinates and the plurality of pre-defined parameters to the first preview frame by adjusting a dimension of the set of facial co-ordinates and the plurality of pre-defined parameters with respect to the first preview frame;

modify the first preview frame by adjusting an exposure of the first preview frame;
post-process the face of the at least one human detected in the second preview frame;
generate the modified first preview frame; and
perform on the face, one or more of a face relighting by adjusting an exposure of the face, a face beautification, a skin-tone mapping, a low light frame enhancement based on the set of facial co-ordinates, a face focus tracking on the face, and a High Dynamic Range (HDR) processing of the first preview frame.

15. The electronic device of claim 9, wherein the failure of detecting the face occurs based on a distance between the at least one human and the first imaging sensor being greater than a pre-determined threshold distance.

16. The electronic device of claim 9, wherein the plurality of pre-defined parameters comprises an exposure, a brightness, and a depth associated with the at least one human in the second preview frame.

17. A non-transitory computer readable storage medium storing instructions that, when executed by at least one processor, cause the at least one processor to:
based on a failure of detecting a face in a first preview frame captured by a first camera, while displaying the first preview frame as a camera preview, capture a second preview frame using a second camera of a scene comprising at least one human with the face at a higher zoom level than the first camera;
detect the face in the second preview frame;
determine, from the second preview frame, a set of facial co-ordinates associated with the face and a plurality of pre-defined parameters associated with the at least one human; and
apply the set of facial co-ordinates and the plurality of pre-defined parameters to the first preview frame to display the modified first preview frame as the camera preview.

18. The non-transitory computer readable storage medium of claim 17, wherein the face is detected in the modified first preview frame.

19. The non-transitory computer readable storage medium of claim 17, wherein the instructions, when executed by the at least one processor, cause the at least one processor to:
receive the first preview frame of the scene comprising the at least one human from the first imaging sensor; and
detect the failure of detecting the face of the at least one human in the first preview frame.

20. The non-transitory computer readable storage medium of claim 17, wherein a second imaging sensor of the second camera is configured with a zoom level higher than a zoom level of a first imaging sensor of the first camera.

* * * * *